US007912486B2

United States Patent
Bantukul et al.

(10) Patent No.: US 7,912,486 B2
(45) Date of Patent: Mar. 22, 2011

(54) METHODS, SYSTEMS, AND COMPUTER PROGRAM PRODUCTS FOR SURVEILLANCE OF MESSAGING SERVICE MESSAGES IN A COMMUNICATIONS NETWORK

(75) Inventors: Apirux Bantukul, Cary, NC (US); Peter J. Marsico, Chapel Hill, NC (US); Venkataramaiah Ravishankar, Cary, NC (US); Travis Earl Russell, Clayton, NC (US)

(73) Assignee: Tekelec, Morrisville, NC (US)

( * ) Notice: Subject to any disclaimer, the term of this patent is extended or adjusted under 35 U.S.C. 154(b) by 0 days.

(21) Appl. No.: 11/202,929

(22) Filed: Aug. 12, 2005

(65) Prior Publication Data

US 2006/0217136 A1    Sep. 28, 2006

Related U.S. Application Data

(60) Provisional application No. 60/665,916, filed on Mar. 28, 2005.

(51) Int. Cl.
*H04W 4/00* (2009.01)
*H04B 17/00* (2006.01)
*H04M 1/24* (2006.01)
(52) U.S. Cl. .............. 455/466; 455/67.12; 379/35
(58) Field of Classification Search .......... 713/201; 455/67.2, 410, 417, 67.11–67.12, 466; 379/35
See application file for complete search history.

(56) References Cited

U.S. PATENT DOCUMENTS

| | | | |
|---|---|---|---|
| 6,504,907 B1 | 1/2003 | Farris et al. | |
| 6,549,613 B1 | 4/2003 | Dikmen | |
| 2002/0009973 A1 | 1/2002 | Bondy et al. | |
| 2002/0184527 A1* | 12/2002 | Chun et al. ............ | 713/201 |

OTHER PUBLICATIONS

Notification of Transmittal of the International Search Report and the Written Opinion of the International Searching Authority, or the Declaration for International Application No. PCT/US2006/011301 (Apr. 30, 2007).
Rosenberg et al., "SIP: Session Initiation Protocol," Network Working Group, RFC 3261 (Jun. 2002).

* cited by examiner

*Primary Examiner* — Nick Corsaro
*Assistant Examiner* — Huy C Ho
(74) *Attorney, Agent, or Firm* — Jenkins, Wilson, Taylor & Hunt, P.A.

(57) ABSTRACT

Methods, systems, and computer program products for surveillance of messaging service messages in a communications network are disclosed. According to one aspect, a system is provided for intercepting a messaging service message in a communications network. The system can include a communication module for receiving and sending messaging service messages from a communications network. Further, the system can include a subscriber surveillance database for maintaining a listing of subscribers that have been placed under surveillance. The system can also include a surveillance function for receiving a messaging service message, extracting a subscriber identifier from the messaging service message, performing a lookup in the surveillance database using the subscriber identifier, and performing a surveillance action in response to locating a matching entry in the database.

45 Claims, 7 Drawing Sheets

METHODS, SYSTEMS, AND COMPUTER PROGRAM PRODUCTS FOR SURVEILLANCE OF MESSAGING SERVICE MESSAGES IN A COMMUNICATIONS NETWORK

RELATED APPLICATIONS

This application claims the benefit of U.S. Provisional Patent Application Ser. No. 60/665,916, filed Mar. 28, 2005, the disclosure of which is incorporated herein by reference in its entirety.

TECHNICAL FIELD

The subject matter disclosed herein relates generally to the surveillance of messages in a communications network. More particularly, the subject matter disclosed herein relates to methods and systems for surveillance of messaging service messages in a communications network.

BACKGROUND

Short message service (SMS) enables mobile subscribers to easily send and receive text messages via wireless handsets. Although specifications and industry standards related to SMS are constantly evolving and being modified, SMS messages have traditionally been used to convey readable text information, where the text can include any combination of characters that can be entered via a keypad or keyboard. Multimedia message service (MMS) extends the basic SMS concept to include a variety of message content types, including text, still images, video, and audio.

SMS delivery service provides a mechanism for transmitting messages to and from SMS capable terminals (e.g., wireless handsets, personal computers, etc.) via the signaling component of the wireless communications network. With particular regard to the sending and receiving of SMS messages by a wireless handset, a signaling network provides the transport facilities necessary to communicate short messages between a store-and-forward network element, known as a short message service center (SMSC), and a wireless handset. In contrast to earlier text message transmission services, such as alphanumeric paging, SMS technology is designed to provide guaranteed delivery of an SMS message to a destination. That is, if a temporary network failure, or the unavailability of a message recipient prohibits the immediate delivery of an SMS message, then the SMS message is stored in the network (i.e., at an SMSC) until the destination/intended message recipient becomes available.

SMS is a messaging feature of Interim Standard 41 (IS-41) and Global System for Mobile Communication (GSM) networks. In IS-41 and GSM mobile network environments, SMS service makes use of mobile application part (MAP), which defines the methods and mechanisms for mobility management signaling communications in a wireless network. The American MAP standard is published by Telecommunication Industry Association and is referred to as IS-41 MAP, while the international standard is defined by the European Telecommunications Standards Institute and is referred to as GSM MAP. Depending upon the particular implementation, SMS service may also utilize the signaling connection control part (SCCP) and transaction capabilities application part (TCAP) components of the SS7 protocol. Within the context of SS7 signaling over Internet protocol (IP), an IP adaptation protocol such as the SCCP user adaptation (SUA) layer defined by the Internet Engineering Task Force (IETF) may also be utilized to facilitate SMS and MMS service. Other signaling protocols, such as session initiation protocol (SIP) may also be used to transport messaging service content (e.g., SMS, MMS, instant message (IM)) through a communications network.

The SCCP, TCAP, and MAP layers of a signaling message may include called and calling party information components. Among the called and calling party information included in these components are called and calling party address parameters. In general, the purpose of these parameters is to identify the called and calling subscribers. Typically, these parameters are in the form of an international mobile station identification (IMSI), mobile identification number (MIN), mobile directory number (MDN), and mobile station international ISDN number (MSISDN). Wireline telephone number identifiers, or electronic mail address identifiers may also be utilized.

Wireless network elements involved in SMS communication include a mobile station (MS), mobile switching center (MSC), visitor location register (VLR), home location register (HLR), and short message service center (SMSC). The MS can either originate or terminate SMS messages. When a MS originates an SMS message to another destination, it is typically called mobile originated SMS (MS-SMS) message. A mobile terminated SMS (MT-SMS) refers to a case where an SMS message is terminated at a MS.

In an effort to protect public safety and national security, Congress passed Public Law 103-414, the Communications Assistance for Law Enforcement Act (CALEA), which sets forth the interception assistance capability requirements that telecommunications carriers need to meet and maintain within their networks to assist law enforcement in conducting electronic surveillance. These requirements apply to the intercept of wireline and wireless communications, including SMS and MMS communications Accordingly, there exists a long-felt need for methods, systems, and computer program products for surveillance of messaging service messages in a communications network. However, neither the CALEA statute nor the SMS or MMS specifications specify methods for surveillance of messaging service communications. Surveillance of messaging service messages may be difficult because, unlike calls, store-and-forward type messaging service communications may be temporarily buffered and delivered long after they are originally sent.

SUMMARY

According to one aspect, the subject matter described herein comprises methods, systems, and computer program products for surveillance of messaging service messages in a communications network. One method includes receiving a messaging service message. Next, the messaging service message can be identified as being associated with a subscriber that has been placed under surveillance. A surveillance action, such as copying the messaging service message and forwarding the message copy to a lawful surveillance entity, may then be performed.

The subject matter described herein providing surveillance of messaging service messages may be implemented using a computer program product comprising computer executable instructions embodied in a computer readable medium. Exemplary computer readable media suitable for implementing the subject matter described herein includes disk memory devices, programmable logic devices, and application specific integrated circuits. In addition, a computer readable medium that implements the subject matter described herein may be distributed across multiple physical devices and/or computing platforms.

BRIEF DESCRIPTION OF THE DRAWINGS

Exemplary embodiments of the subject matter will now be explained with reference to the accompanying drawings, of which.

DETAILED DESCRIPTION

The methods, systems, and computer program products described herein for surveillance of messaging service messages in a communications network may be implemented using an underlying hardware architecture similar to that of a telecommunications network packet routing node, such as a signaling system 7 (SS7) signal transfer point (STP); a mobile switching center (MSC), a short message service center (SMSC); an SS7/Internet protocol (IP) signaling gateway (SG) routing node; a session initiation protocol (SIP) router; or a SIP proxy server. The subject matter described herein may also be implemented within other suitable network elements and components as described hereinbelow.

Figure 1:
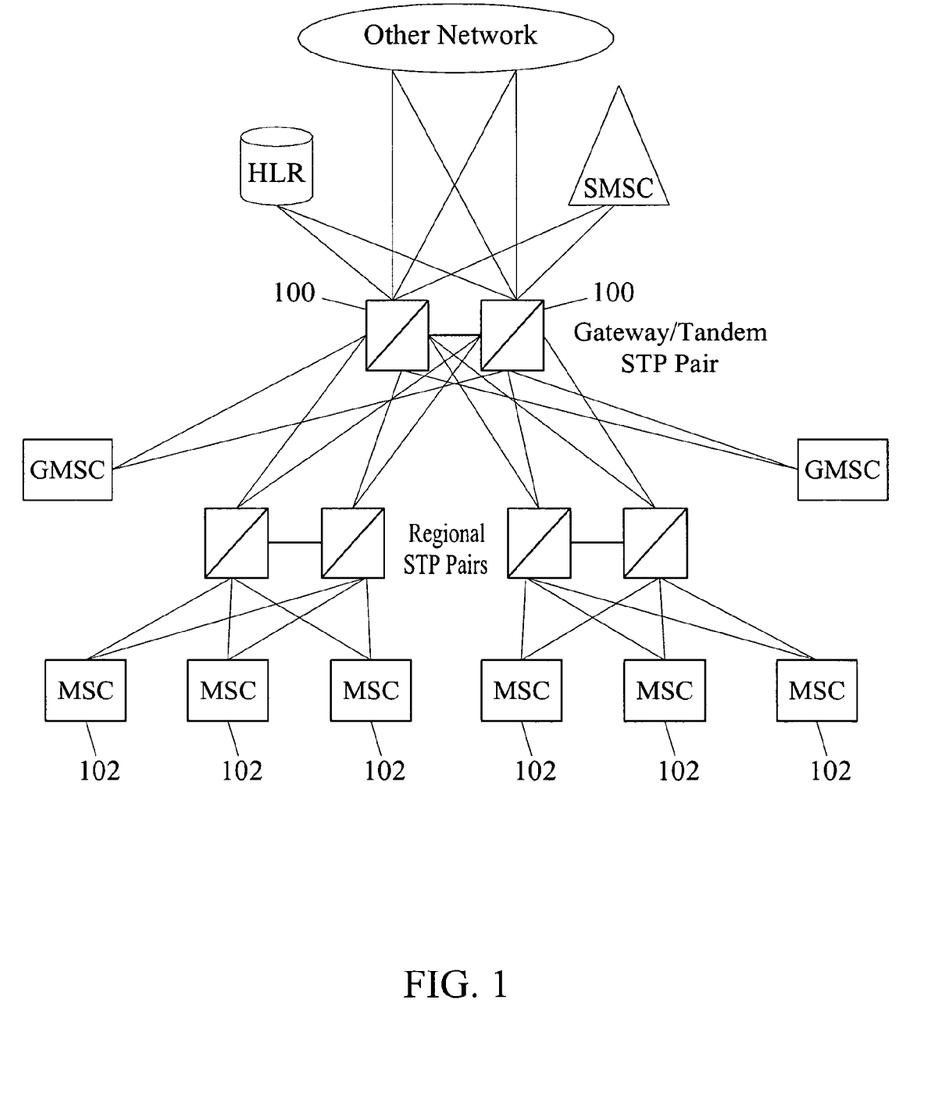
FIG. 1 is a network diagram of an exemplary mobile communications network having a hierarchical network topology.
Figure 2:
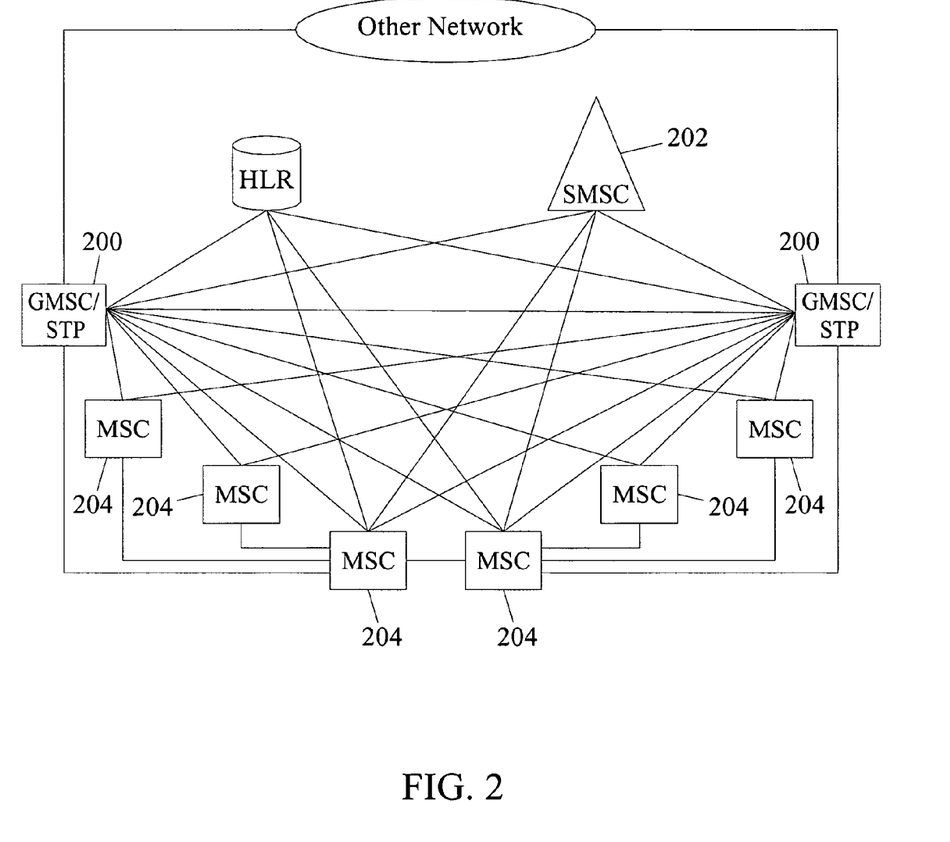
FIG. 2 is a network diagram of another exemplary mobile communications network having a meshed network topology.

According to one embodiment, the subject matter described herein involves the surveillance of predetermined communication service subscribers by intercepting SMS messages and performing a surveillance action in response to receiving an SMS message associated with a subscriber under surveillance. These subscribers may be those that have been placed under lawful surveillance. Further, it will be appreciated by those of ordinary skill in the art that SMS service can involve the exchange of signaling information between SMS entities in a wireless communication network (e.g., person-to-person messaging, person-to-machine messaging, and machine-to-machine messaging). Exemplary communications networks in which embodiments of the subject matter disclosed herein may be implemented include a hierarchical network topology and meshed network topology. FIG. 1 is a network diagram of an exemplary mobile communications network that includes hierarchical network topology. FIG. 2 is a network diagram of another exemplary mobile communications network including a mesh network topology. Surveillance of messaging service messages according to the subject matter disclosed herein may be implemented at any suitable element of the exemplary mobile communications networks shown in FIGS. 1 and 2. For example, the surveillance of messaging service messages according to the subject matter disclosed herein may be implemented at one or more of STPs 100 and MSCs 102 shown in FIG. 1, or implemented at one or more of STPs 200, SMSC 202, and MSCs 204 shown in FIG. 2.

Figure 3:
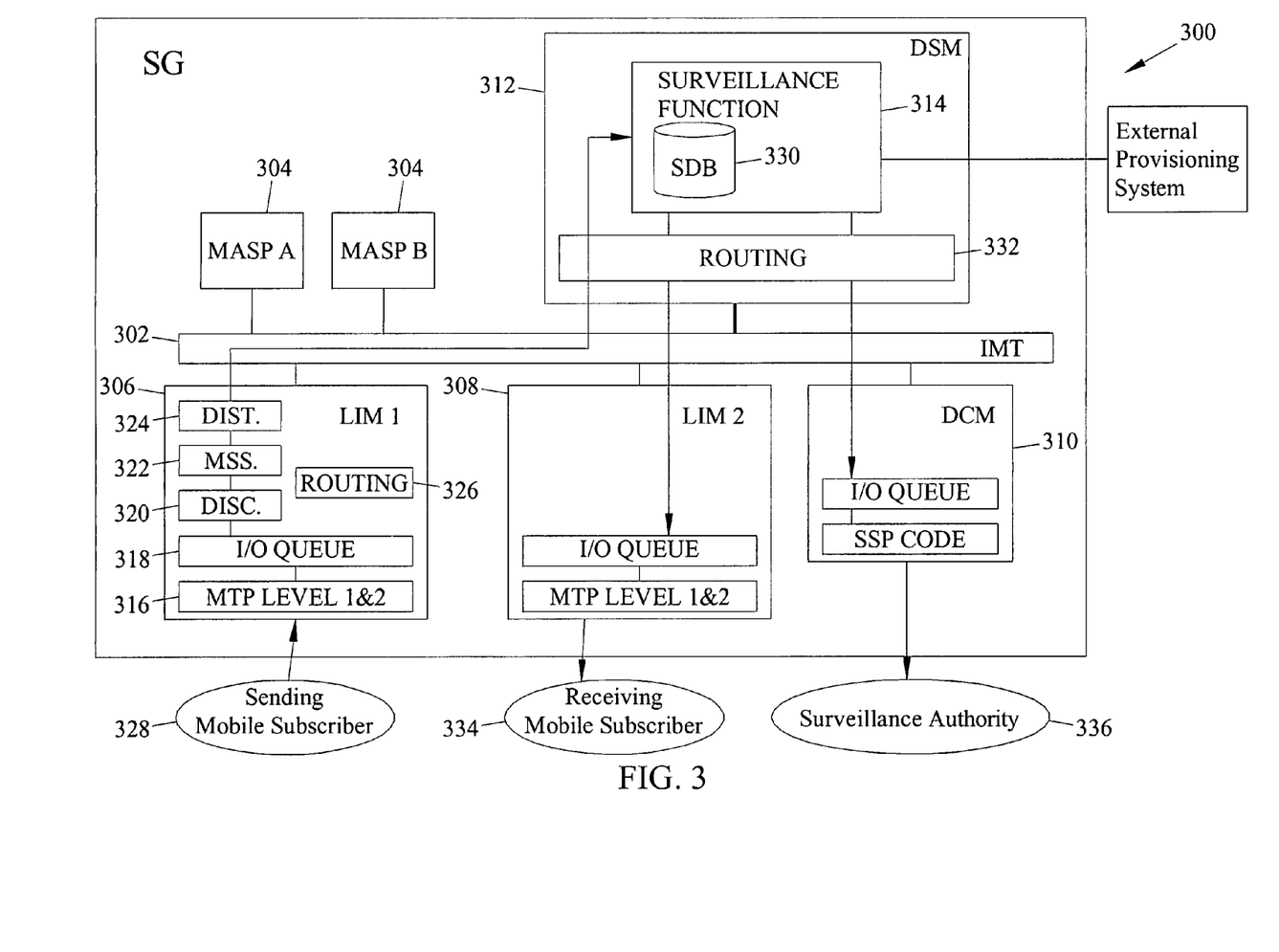
FIG. 3 is an SS7/IP signaling gateway (SG) node that includes a function for surveillance of messaging service messages according to an embodiment of the subject matter disclosed herein.

The EAGLE® STP, the IP7® Secure Gateway, and the TEKSERVER® platform (all available from Tekelec of Calabasas, Calif.) are suitable systems for implementing surveillance of messaging service messages according to the subject matter disclosed herein. FIG. 3 illustrates an SS7/IP signaling gateway (SG) node that includes a function for surveillance of messaging service messages according to an embodiment of the subject matter disclosed herein. Referring to FIG. 3, SG 300 includes an interprocessor message transport (IMT) bus 302 that is the main communication bus among internal subsystems within SG 300. In one embodiment, this high-speed communications system includes two counter-rotating serial rings. A number of distributed processing modules or cards may be coupled to IMT bus 302. In FIG. 3, these cards include a pair of maintenance and administration subsystem processors (MASPs) 304, a first SS7 link interface module (LIM) 306, a second SS7 LIM 308, an IP-capable data communication module (DCM) 310, and a database service module (DSM) 312, which is adapted to host a surveillance function 314 and surveillance database 316. These modules are physically connected to IMT bus 302 such that signaling and other types of messages may be routed internally between active cards or modules. For simplicity of illustration, only two LIMs, a single DCM, and a single DSM cards are included in FIG. 3. However, SG node 300 may include multiple LIM, DCM, DSM, and other cards, all of which may be simultaneously connected to and communicating via IMT bus 302.

MASP pair 304 provides maintenance communications, initial program load, peripheral services, alarm processing, and system disks.

First LIM 306 may include an SS7 MTP level 1 and 2 function 316, an I/O queue 318, an SS7 MTP level 3 layer discrimination function 320, a messaging service surveillance (MSS) screening function 322, a distribution function 324, and a routing function 326. LIM 306 may receive messaging packets from a sending mobile subscriber 328. MTP level 1 and 2 function 316 includes hardware and software for sending and receiving digital data in the form of a messaging packet over a particular physical medium. For example, MTP level 1 and 2 function may provide error detection, error correction, and sequenced delivery of SS7 message packets. I/O queue 318 may provide temporary buffering of incoming and outgoing signaling message packets.

MTP level 3 discrimination function 320 performs discrimination operations, which may include determining whether a received message is to be allowed into the SG system and determining whether the received message packet requires processing by an internal processing subsystem or is simply to be through switched (i.e., routed on to another node in the network). As such, discrimination function 320 may effectively provide SG 300 with a network firewall. Discrimination function 320 may examine received message parameters, including message transfer part (MTP) routing label parameters, signaling connection control part (SCCP) layer parameters, transaction capabilities control part (TCAP) layer parameters, and mobile application part (MAP) layer parameters. Exemplary discrimination parameters include origination point code (OPC)/destination point code (DPC) parameters, a service indicator (SI) parameter, SCCP called and calling party address parameters, an SCCP subsystem (SSN) parameter, a translation type (TT) parameter, a MAP operation code (OpCode) parameter, and others. Discrimination based on these parameters enables function 320 may copy a received signaling message, such that the original message may be routed to the target destination and the message copy may be processed by one or more processing subsystems associated with SG 300.

MSS screening function 322 may examine incoming signaling messages and determine whether the messages require MSS processing. For example, MSS screening function 322 may examine a received SS7 signaling message, and determine whether the message is destined for an SMSC. The determination may be made, for instance, by examining an SS7 destination point code address contained in the message. In another embodiment, SCCP information may be used. For example, an SCCP called party subsystem (SSN) parameter may be examined to determine if the message includes mobile application part (MAP) information (e.g., SSN=5), or an SCCP translation type (TT) parameter may be examined/utilized. MAP layer information may also be examined to determine if a received message includes an SMS payload. In yet another embodiment, MSS screening function 322 may include or have access to information that identifies subscribers that have been placed under surveillance. MSS screening function 322 may examine a received signaling message and determine whether the received message includes messaging service content (e.g., SMS message), and if so, whether the messaging service message is addressed to or from a subscriber under surveillance. If MSS screening function 322 determines that a received message requires MSS processing, MSS screening function 322 can forward the message to distribution function 324, which in turn distributes the message to surveillance function 314.

DSM 312 includes hardware and software for surveillance of messaging service messages. Surveillance function 314 can receive and process messaging service messages. Further, DSM 310 can include a subscriber surveillance database 330 for maintaining a listing of subscribers that have been placed under surveillance. The subscribers can be identified by an address or other suitable identifier. Surveillance function 314 may extract a subscriber identifier from a received messaging service message and perform a lookup in database 330 using the subscriber identifier in the message service message. In response to locating a matching entry in database 330, surveillance function 314 can perform a surveillance action.

According to one embodiment, subscriber surveillance database 330 may contain information that identifies a surveillance action that is to be performed for a particular subscriber. Further, database 330 may contain information that identifies the surveillance authority that is to be notified or sent a copy of the messaging service message. Exemplary surveillance authority identification information may include an e-mail address, an Internet protocol address, a telephone number, and a session initiation protocol URI. Exemplary surveillance actions may include copying the message, sending a notification message, creating a call detail record, blocking delivery of the message, and generating a peg count. Multiple surveillance actions may be specified for a single subscriber. In addition, a surveillance period start/stop day and time parameters may be associated with each surveillance action, and these parameters may be used to determine whether to invoke the specified surveillance action during the time period between the start/step day and time parameters. In one embodiment, database 330 may contain multiple rule sets, such that one set of surveillance action rules applies to the message receiving party, and another set of surveillance action rules applies to the message sending party.

Table 1 below shows an exemplary subscriber surveillance database.

TABLE 1

Exemplary Subscriber Surveillance Database

| Subscriber ID | Surveillance Action | Surveillance Authority | Contact Mode | Start Surv. | End Surv. |
|---|---|---|---|---|---|
| 1234567890 | MSG COPY | fraud@FBI.gov | e-mail | May 10, 2005 | Jun. 10, 2005 |
| 2345678901 | NOTIFY, CDR | 4567890123 | SMS | * | * |
| 3456789012 | MSG COPY | 5678901234 | voice-mail | * | * |

According to one embodiment, if a matching entry is located in database 330, a copy of the SMS message be generated and communicated by a routing application 332 to a surveillance authority/center via DCM 310. Alternatively, the SMS message copy can be communicated via LIM 308. The original message may be forwarded to its destination at receiving mobile subscriber 334 via LIM 308.

Referring to Table 1 above, the SMS message copy may be communicated to a surveillance authority 336 by modifying the routing address information in the message copy, so as to cause the message copy to be routed and delivered to an address corresponding to a surveillance authority/center. Alternatively, the SMS message copy may be encapsulated or adapted for transport using a protocol other than MAP/TCAP. For example, the message copy information may be encapsulated or adapted for transport through an IP network using SIP. The copied information may, for instance, be placed within a SIP INFO or SIP MESSAGE message, and routed via an IP network to a destination address/application corresponding to surveillance authority/center. Further, for example, the information in the SMS message copy may be placed into an e-mail format, and communicated to the surveillance authority/center as an e-mail message.

Although in FIG. 3, messaging service surveillance functions are resident on signaling gateway 300, the subject matter described herein is not limited to such an implementation. In an alternative implementation, some or all of the surveillance functions illustrated in FIG. 3 may be resident on a TEKSERVER® platform (all available from Tekelec of Calabasas, Calif.) separate from signaling gateway 300. For example, surveillance function 314 and surveillance database 316 may be resident on a TEKSERVER® platform adjacent to signaling gateway 300 that receives messaging service messages from DSM 312 illustrated in FIG. 3.

Figure 4A:
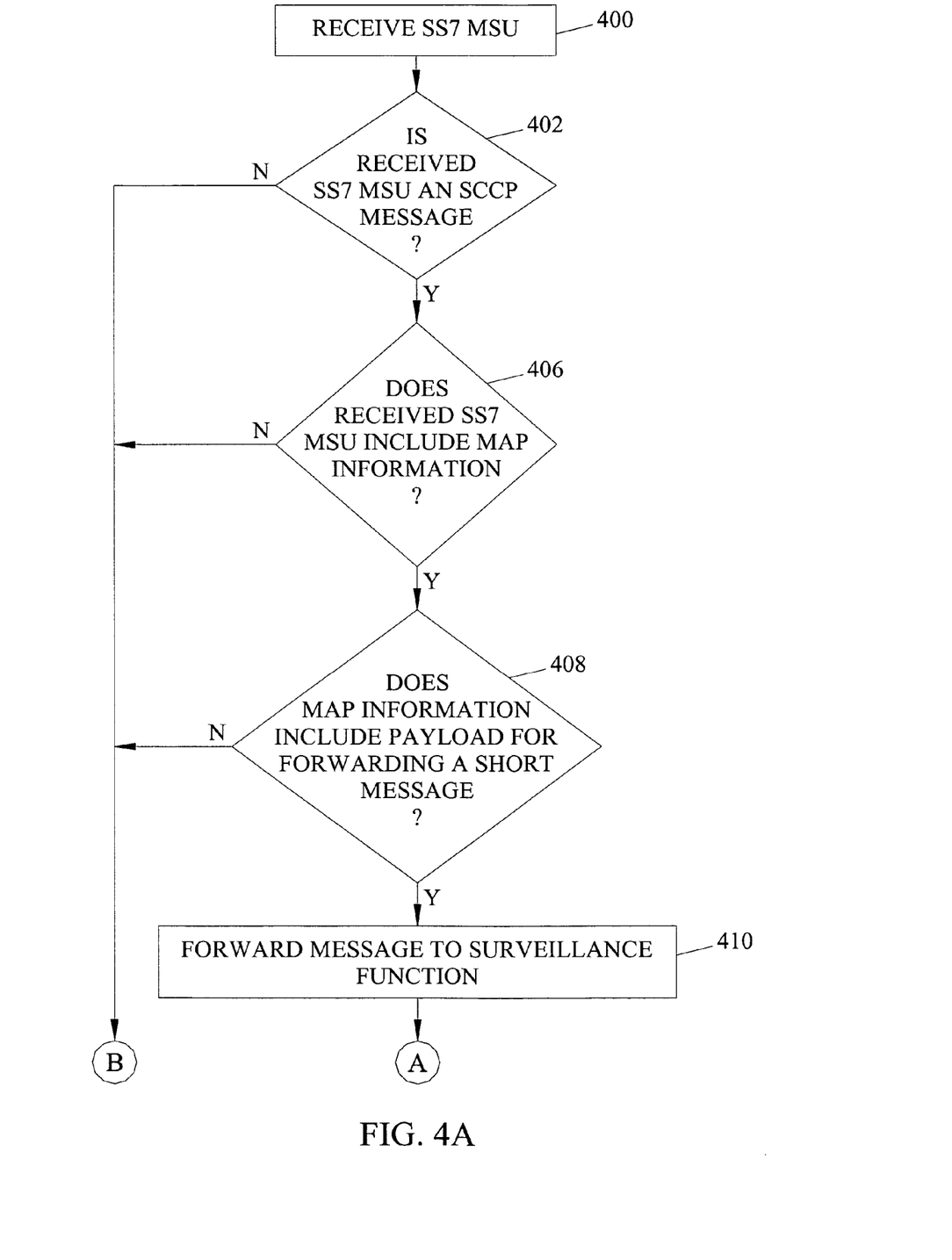
FIGS. 4A and 4B are flow charts of a process associated with a subscriber surveillance function according to an embodiment of the subject matter disclosed herein.
Figure 4B:
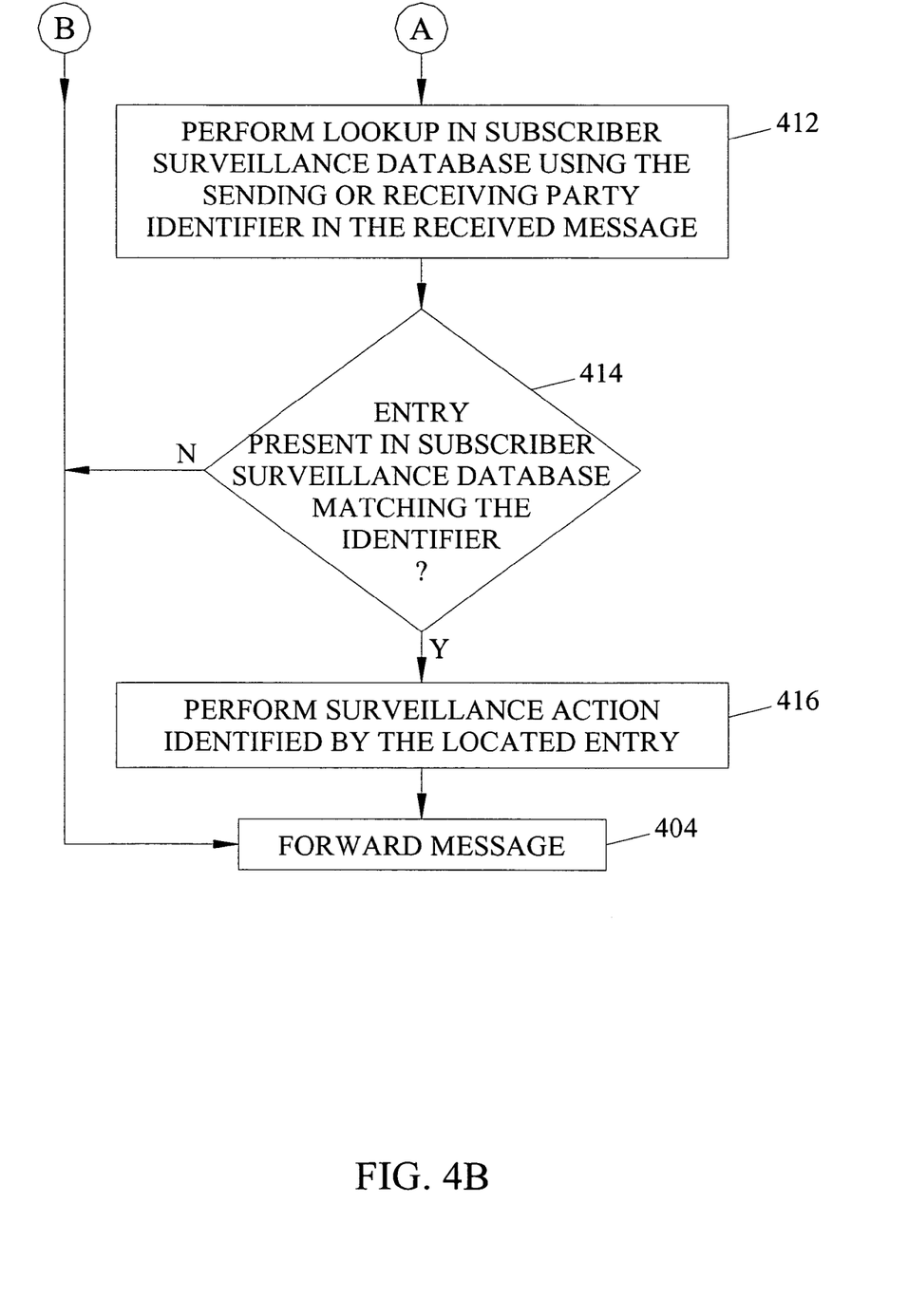

FIGS. 4A and 4B are flow charts of a process associated with a messaging service surveillance function according to an embodiment of the subject matter disclosed herein. Referring to FIG. 4A, an SS7 MSU is received at LIM 306 (step 400). Initially, it is determined whether the message is a messaging service message at steps 402-408. Referring to step 402, MSS screening function 322 can determine whether the SS7 MSU is an SCCP message (i.e., SI=3) (step 402). If it is determined that the SS7 MSU is not an SCCP message, the process proceeds to step 404 (shown in FIG. 4B) where the received message is forwarded for further processing by SG 300, such as forwarding to its destination. If the message is determined to be an SCCP message, an SCCP subsystem (SSN) parameter value is examined to determine whether the message includes mobile application part (MAP) information (i.e., SSN=5) (step 406). Otherwise, the process proceeds to step 404.

If the message is determined to contain MAP information at step 406, a MAP Operation Code (Op Code) parameter can be examined to determine whether the MAP information includes payload for forwarding a short message (i.e., Op Code=2E Hex) (step 408). If it is determined that the MAP information does not include payload for forwarding a short message, the process proceeds to step 404. Otherwise, if it is determined that the MAP information includes payload for forwarding a short message, the process proceeds to step 410.

At step 410, the received message can be forwarded to surveillance function 314 of DSM 312 via distribution function 324. In an alternate embodiment, a copy of the received message can be generated, and the message copy is forwarded to surveillance function 314, while the original received message is routed to its destination.

Next, referring to step 412 shown in FIG. 4B, surveillance function 314 can perform a lookup in subscriber surveillance database 330 using sending or receiving party identifier in the received message. At step 414, it can be determined whether an entry in database 330 is located that matches the identifier. If a matching entry is not located, the process can proceed to step 414. For example, the message can be forwarded to its destination by transmission onto an appropriate link connected to DCM 310, outbound via LIM 308, or another DCM or LIM.

Referring again to step 414, if a matching entry is located, the process proceeds to step 416 where a surveillance action is performed. For example, as stated above, surveillance action may include copying the message, sending a notification message, creating a call detail record, blocking delivery of the message, and generating a peg count. The matching entry can include formatting and routing information for implementing the surveillance action. Next, the process proceeds to step 404. A copy of at least a portion of the received message can be routed to its destination.

According to another embodiment, the SMS message copy or derived e-mail content may be converted from text to voice. This feature may enable a surveillance agent in the field to use a mobile telephone to listen to the contents of the SMS message copy. In another embodiment, an alarm or notification message may be generated which contains information associated with an intercepted SMS message that is destined to/sent from a subscriber under surveillance. The notification message may then be sent to the surveillance authority/center. Also, a communication or call detail record (CDR) may be generated for those messages that are associated with a subscriber under surveillance. In this case, a single CDR may be generated which includes information from a messaging transaction that is comprised of multiple SMS messages.

With regard to intercepting SMS messages, it will be appreciated that according to one embodiment of the subject matter described herein, SIP message carrying SMS, MMS, or IM content may also be intercepted and processed in a manner similar to that described for SS7 MAP transported messaging service messages. The subject matter described is not limited to applications in an SS7 MAP/TCAP signaling environment. Messaging service messages (e.g., SMS, MMS, IM) that are transported using SIP, IETF, SIGRTRAN protocols (e.g., SUA), may also be intercepted and processed in a manner similar to that described above with respect to SS7 MAP/TCAP-based SMS messages. For SIP messages, messaging service surveillance may be performed by identifying and analyzing SIP MESSAGE or SIP INFO messages, which are used to carry messaging service message content. For SIGTRAN messages, surveillance may be performed using the steps illustrated in FIG. 4 based on the SCCP and MAP content carried in the SIGTRAN messages. As such, embodiments of the subject matter described may be implemented at or on a SIP server, an IP router, an SS7/IP gateway, a signal transfer point, a softswitch, a media gateway controller, an MSC, an SMSC, an IP multimedia subsystem (IMS) messaging server, or other network components.

According to the subject matter described herein, SMS message surveillance may be performed at other nodes in a wireless network, including an SMSC. As described above for the case of an STP-based solution, an SMSC of the subject matter described herein may examine a received SMS message, identify the called and/or called party associated with the message, perform a check to determine whether the called and/or called party has been placed under lawful surveillance, and copy the SMS message in response to determining that the called/calling party is under surveillance. The SMS message copy may then be communicated to a surveillance authority/center.

Discrimination, MSS screening, and message distribution functions similar to those described above may be incorporated on a SIP-enabled communication module, such as DCM module. The DCM may receive and internally distribute SIP messages, such as SIP MESSAGE or SIP INFO messages, in a manner similar to that described above with respect to an SS7 LIM module. The SIP protocol is described in Rosenberg et al., *SIP: Session Initiation Protocol*, Internet Engineering Task Force (IETF) Request for Comments (RFC) 3261, June 2002, the disclosure of which is incorporated herein by reference in its entirety.

It will be appreciated that a similar message interception/surveillance scheme can be employed with regard to other types of messaging services, such as multimedia messaging service (MMS) and instant message (IM) service. Depending upon the particular type of messaging service that is to be monitored and the network configuration, the subscriber surveillance database and message interception function may be strategically placed at one or more nodes in the network. For example, in a SIP-based network, the subject matter described herein may be implemented on a SIP router, a SIP proxy server, a SIP messaging server, or an IP Multimedia Subsystem (IMS) network element.

Figure 5:
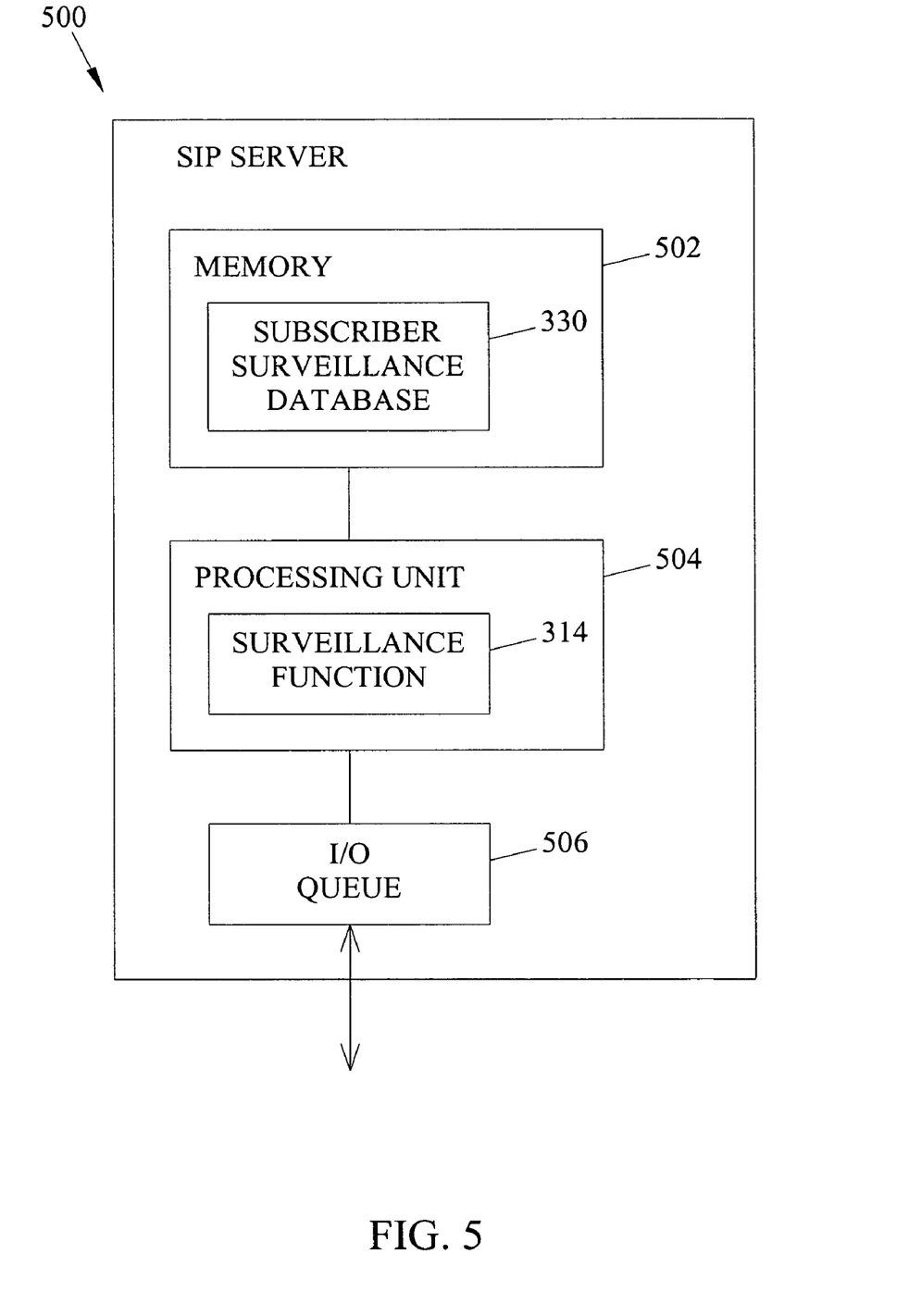
FIG. 5 is a session initiation protocol (SIP) server that includes a function for surveillance of SIP-based messaging service messages according to the subject matter disclosed herein.

FIG. 5 illustrates a SIP server that includes a function for surveillance of SIP messages carrying messaging service content according to the subject matter disclosed herein. Referring to FIG. 5, SIP server 500 includes a memory 502, a processing unit 504, and an I/O queue 506. I/O queue 506 can communicate SIP messages, such as an SIP MESSAGE message and an SIP INFO message. SIP server 500 may be adapted to execute telecommunications applications for communicating in accordance with the SIP protocol.

Referring to FIG. 5, I/O queue 506 may forward the receive SIP message to processing unit 504 for further processing. Processing unit 504 may include hardware and software for surveillance of SIP messages according to the subject matter disclosed herein. Surveillance function 314 can extract a subscriber identifier (such as a To or From parameter) from a received SIP message and perform a lookup in a subscriber surveillance database 330 using the extracted subscriber identifier in the SIP message. In response to locating a matching entry in database 330, surveillance function 314 can perform a surveillance action. The SIP message may then be further processed by SIP server 500 and forwarded to another network component.

Subscriber surveillance database 330 may contain information that identifies a surveillance action that is to be performed for a particular subscriber. For example, database 330 may contain information that identifies the surveillance authority that is to be notified or sent a copy of the messaging service message. Exemplary surveillance authority identification information may include an e-mail address, an Internet protocol address, a telephone number, and a session initiation protocol URI. Other exemplary surveillance actions may include copying the message, sending a notification message, creating a call detail record, blocking delivery of the message, and generating a peg count. Multiple surveillance actions may be specified for a single subscriber. In addition, a surveillance period start/stop day and time parameters may be associated with each surveillance action, and these parameters may be used to determine whether to invoke the specified surveillance action during the time period between the start/step day and time parameters.

The subject matter disclosed herein may also be implemented in an IP multimedia-subsystem (IMS)-enabled network element such as an STP or other node with IMS capabilities. An exemplary IMS-enabled node in which the subject matter described herein may be implemented is described in commonly assigned, co-pending U.S. Patent Application No. 60/637,337, filed Dec. 17, 2004, the disclosure of which is incorporated herein by reference in its entirety. Briefly, the subject application describes an IMS cluster node receives communication session related messages for subscribers and that retrieves and caches subscriber information used to complete the session. Any of the messaging service surveillance functions described above may be located at such a node to screen messaging service messages sent over an IMS network.

The subject matter disclosed herein for surveillance of messaging service messages may also be implemented in signaling message routing node with interface A-offload functionality such as that described in commonly assigned, co-pending U.S. patent application Ser. No. 09/957,657 filed Oct. 11, 2001, the disclosure of which is incorporated herein by reference in its entirety. Briefly, the subject patent application describes a signaling message routing node that offloads short message service message traffic from the A-interface between a MSC and a BSC. The messaging service surveillance functionality described herein may be implemented on such a node to screen messaging service messages at the A-interface.

It will also be appreciated that the subject matter described herein may be implemented as a stand-alone monitoring system that may use external communication link probes or taps to obtain copies of messaging service messages. A monitoring system, such as the SENTINEL™ platform available from Tekelec of Calabasas, Calif. may provide surveillance according to the subject matter disclosed herein of messages transmitted between network elements, such as an STP, SS7/IP signaling gateway, SIP router, a SIP proxy server, a SIP messaging server, or an IMS network element.

Figure 6:
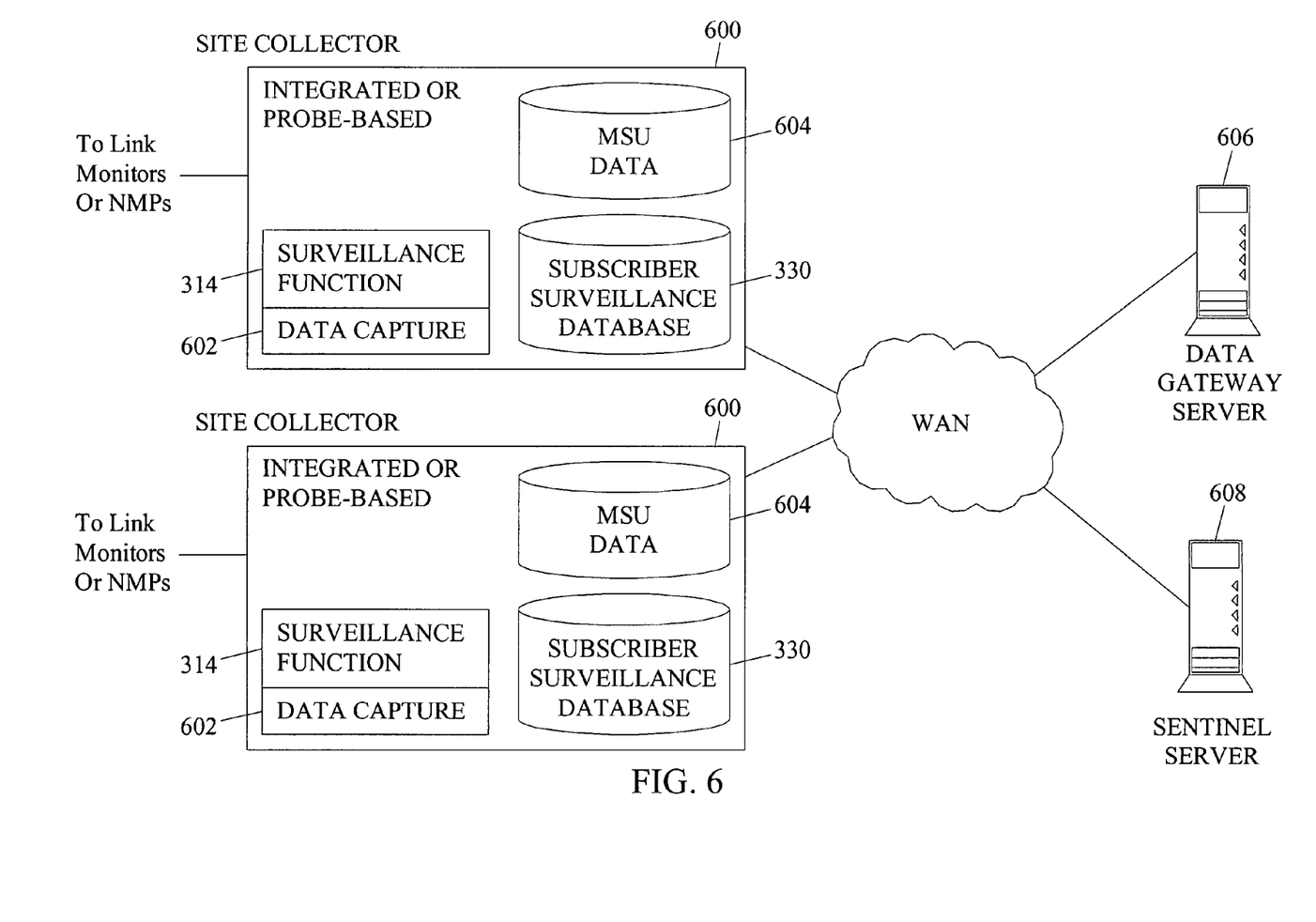
FIG. 6 is an exemplary monitoring system architecture for performing surveillance according to the subject matter disclosed herein.

FIG. 6 illustrates an exemplary monitoring system architecture that is based on the SENTINEL™ platform and performs surveillance according to the subject matter disclosed herein. According to one embodiment, the monitoring system architecture can collect signaling information from either discrete communication link probes or from an integrated signal transfer point/signaling gateway message copying interface. Referring to FIG. 6, a pair of site collectors 600 collects and temporarily buffers monitored signaling messages retrieved from a wide area network (WAN). Site collectors 600 may be connected to external signaling link probes that passively copy signaling messages from SS7 signaling links or to network monitoring processors (NMPs) that receive and store signaling messages copied from signaling links within a routing node, such as an STP.

Each site collector 600 may be a general purpose computing platform including a microprocessor and one or more applications executing thereon. In the illustrated example, each site collector includes surveillance function 314, a data capture application 602, an MSU database 604, and subscriber surveillance database 330. Surveillance function 314 can receive signaling messages captured by data capture application 602 and perform a lookup in database 330 using an address or identifier contained in the captured signaling message. In response to locating a matching entry in database 330, surveillance function 314 can perform a surveillance action as described herein. For example, a copy of a captured message having a matched identifier or address can be communicated to a surveillance authority/center. Alternatively, a captured message having a matched identifier or address can be communicated to a data gateway 606 for implementation of a surveillance action according to the subject matter disclosed herein. SENTINEL™ server 608 may be used to download new subscriber surveillance information to subscriber surveillance databases 330.

At an alternative implementation, surveillance function 314 and surveillance databases 330 may reside on data gateway server 606.

According to one embodiment, the subject matter described herein may be applied in a business-related environment. For example, a business may have a policy to monitor incoming or outgoing SMS, MMS, or IM messages to prevent certain unacceptable behavior. Further, for example, a business may utilize the subject matter described herein to restrict SMS, MMS, or IM usage among a predetermined group of users, such as within a Closed User Group.

It will be understood that various details of the subject matter disclosed herein may be changed without departing from the scope of the disclosed subject matter. Furthermore, the foregoing description is for the purpose of illustration only, and not for the purpose of limitation, as the subject matter disclosed herein is defined by the claims as set forth hereinafter.

What is claimed is:

1. A method for providing surveillance of messaging service messages in a communications network, the method comprising:
   in a signal transfer point (STP):
      receiving a signaling message at the STP;
      determining that the signaling message requires processing by the STP;
      evaluating a messaging service surveillance (MSS) processing discrimination parameter in the signaling message;
      examining the signaling message to determine message type based on said parameter;
      determining based on said message type that the message is a messaging service message and if so, determining whether the message is destined for a Short Message Service Center (SMSC);
      identifying, using a subscriber surveillance database within the STP, the messaging service message as being associated with a subscriber that has been placed under surveillance;
      generating, using a surveillance function located within the STP, a copy of the messaging service message; and
      forwarding the message copy to a surveillance entity.

2. The method of claim 1 wherein receiving a signaling message includes receiving a short message service message.

3. The method of claim 1 wherein receiving a signaling message includes receiving a multimedia message service message.

4. The method of claim 1 wherein receiving a signaling message includes receiving an instant message.

5. The method of claim 1 wherein receiving a signaling message includes receiving a mobile application part (MAP) message including messaging service content.

6. The method of claim 1 wherein receiving a signaling message includes receiving a session initiation protocol (SIP) message.

7. The method of claim 1 wherein identifying the messaging service message as being associated with a subscriber that has been placed under surveillance includes identifying the messaging service message as being sent by a subscriber that has been placed under surveillance.

8. The method of claim 1 wherein identifying the messaging service message as being associated with a subscriber that has been placed under surveillance includes identifying the messaging service message as being sent to a subscriber that has been placed under surveillance.

9. The method of claim 1 wherein identifying the messaging service message as being associated with a subscriber that has been placed under surveillance includes using subscriber identification information extracted from the message to perform a lookup in a subscriber surveillance database.

10. The method of claim 1 wherein generating a copy of the messaging service message includes generating an electronic mail (email) message that includes information associated with the messaging service message.

11. The method of claim 1 wherein generating a copy of the messaging service message includes generating a SIP message that includes information associated with the messaging service message.

12. The method of claim 1 wherein generating a copy of the message includes generating a copy of the message and performing a media-type conversion on the message contents.

13. The method of claim 12 wherein a media-type conversion includes performing a text-to-voice conversion.

14. The method of claim 13 including generating a voice-mail message using the converted message content.

15. The method of claim 1 including routing the received messaging service message to its target destination.

16. The method of claim 1 wherein the signal transfer point includes IMS capabilities.

17. The method of claim 1 wherein the signal transfer point includes A-interface offload capabilities.

18. A system for intercepting a messaging service message in a communications network and for providing surveillance, the system comprising:
a signal transfer point (STP) including:
a communication module located within the STP for receiving a signaling message at the STP, for determining that the signaling message requires processing by the STP, for evaluating a messaging service surveillance (MSS) processing discrimination parameter in the signaling message, for examining the signaling message to determine message type based on said parameter, for determining based on said message type that the message is a messaging service message and if so, for determining whether the message is destined for a Short Message Service Center (SMSC);
a subscriber surveillance database located within the STP for maintaining a listing of subscribers that have been placed under surveillance; and
a surveillance function located within the STP for receiving the messaging service message and:
i. extracting a subscriber identifier from the messaging service message;
ii. performing a lookup in the surveillance database using the subscriber identifier; and
iii. in response to locating a matching entry in the database, performing a surveillance action.

19. The system of claim 18 wherein the surveillance database includes information that specifies the type of surveillance action that is required.

20. The system of claim 18 wherein a surveillance action includes generating a copy of at least a portion of the messaging service message content.

21. The system of claim 20 wherein the surveillance action includes transmitting the copy to a surveillance authority.

22. The system of claim 21 wherein the surveillance action includes generating a surveillance authority notification message that includes information associated with the messaging service message.

23. The system of claim 18 wherein the surveillance action includes transmitting the surveillance authority notification message to a surveillance authority.

24. The system of claim 18 wherein the surveillance action includes generating a call detail record (CDR) associated with the messaging service message.

25. The system of claim 18 wherein the surveillance database includes information that specifies the surveillance authority that is to be notified when a surveillance action is required.

26. The system of claim 25 wherein the information that identifies the surveillance authority includes an electronic mail address.

27. The system of claim 25 wherein the information that identifies the surveillance authority includes an Internet protocol address.

28. The system of claim 25 wherein the information that identifies the surveillance authority includes a telephone number address.

29. A computer program product comprising computer executable instructions embodied in a computer readable medium for performing steps comprising:
in a signal transfer point (STP):
receiving a signaling message at the STP;
determining that the signaling message requires processing by the STP;
evaluating a messaging service surveillance (MSS) processing discrimination parameter in the signaling message;
examining the signaling message to determine message type based on said parameter;
determining based on said message type that the message is a messaging service message and if so, determining whether the message is destined for a Short Message Service Center (SMSC);
identifying, using a subscriber surveillance database located within the STP, the messaging service message as being associated with a subscriber that has been placed under surveillance;
generating, using a surveillance function located within the STP, a copy of the messaging service message; and
forwarding the message copy to a surveillance entity.

30. The computer program product of claim 29 wherein receiving a signaling message includes receiving a short message service message.

31. The computer program product of claim 29 wherein receiving a signaling message includes receiving a multimedia message service message.

32. The computer program product of claim 29 wherein receiving a signaling message includes receiving an instant message.

33. The computer program product of claim 29 wherein receiving a signaling message includes receiving a mobile application part (MAP) message including messaging service content.

34. The computer program product of claim 29 wherein receiving a signaling message includes receiving a session initiation protocol (SIP) message.

35. The computer program product of claim 29 wherein identifying the messaging service message as being associated with a subscriber that has been placed under surveillance includes identifying the messaging service message as being sent by a subscriber that has been placed under surveillance.

36. The computer program product of claim 29 wherein identifying the messaging service message as being associated with a subscriber that has been placed under surveillance includes identifying the messaging service message as being sent to a subscriber that has been placed under surveillance.

37. The computer program product of claim 29 wherein identifying the messaging service message as being associated with a subscriber that has been placed under surveillance includes using subscriber identification information extracted from the message to perform a lookup in a subscriber surveillance database.

38. The computer program product of claim 29 wherein generating a copy of the messaging service message includes generating an electronic mail (email) message that includes information associated with the messaging service message.

39. The computer program product of claim 29 wherein generating a copy of the messaging service message includes generating a SIP message that includes information associated with the messaging service message.

40. The computer program product of claim 29 wherein generating a copy of the message includes generating a copy of the message and performing a media-type conversion on the message contents.

41. The computer program product of claim 40 wherein a media-type conversion includes performing a text-to-voice conversion.

42. The computer program product of claim 41 including generating a voicemail message using the converted message content.

43. The computer program product of claim 29 including routing the received messaging service message to its target destination.

44. The computer program product of claim 29 wherein the signal transfer point includes IMS capabilities.

45. The computer program product of claim 29 wherein the signal transfer point includes A-interface offload capabilities.

* * * * *